United States Patent
Dalla Mana

(10) Patent No.: US 8,049,453 B2
(45) Date of Patent: Nov. 1, 2011

(54) STATIC SWITCH FOR MOTORS OF CLIMATE CONTROL UNITS AND CLIMATE CONTROL UNIT COMPRISING THE SWITCH

(75) Inventor: Giuseppe Dalla Mana, Vigonza (IT)

(73) Assignee: Emerson Network Power S.R.L., Piove di Sacco (IT)

( * ) Notice: Subject to any disclaimer, the term of this patent is extended or adjusted under 35 U.S.C. 154(b) by 538 days.

(21) Appl. No.: 12/292,788

(22) Filed: Nov. 26, 2008

(65) Prior Publication Data

US 2009/0134825 A1   May 28, 2009

(30) Foreign Application Priority Data

Nov. 28, 2007  (IT) ............................... MI2007A2243

(51) Int. Cl.
*H02P 6/08* (2006.01)
(52) U.S. Cl. .................................. 318/558; 318/400.01
(58) Field of Classification Search ............. 318/400.01, 318/558, 599, 700
See application file for complete search history.

(56) References Cited

U.S. PATENT DOCUMENTS

| | | | | |
|---|---|---|---|---|
| 5,397,970 A | * | 3/1995 | Rowlette et al. | 318/400.09 |
| 5,625,265 A | * | 4/1997 | Vlahu | 318/400.27 |
| 6,788,014 B2 | * | 9/2004 | Kissich et al. | 318/434 |
| 7,221,858 B2 | * | 5/2007 | Ku | 318/400.08 |
| 7,795,827 B2 | * | 9/2010 | Jeung | 318/400.04 |
| 2005/0088868 A1 | | 4/2005 | Ryan et al. | |

FOREIGN PATENT DOCUMENTS

| | | |
|---|---|---|
| EP | 1 357 662 A | 10/2003 |
| FR | 2 747 522 A | 10/1997 |
| JP | 10 146088 A | 5/1998 |

* cited by examiner

*Primary Examiner* — Bentsu Ro
(74) *Attorney, Agent, or Firm* — Modiano & Associati; Albert Josif; Daniel O'Byrne

(57) ABSTRACT

A static switch for DC motors of climate control units, comprising a signal side and a power side, which are mutually separated by means of optoisolators, the side comprising in input at least one terminal for a motor on/off signal and a terminal for a pulse width modulation signal PWM to provide the amplitude modulation, on the power side, of a motor speed signal, the switch comprising a precharging device which has a control terminal connected to a power-on optoisolator and a precharging current supply terminal connected to a motor power supply pole, the switch further comprising at least one power-on transistor connected to the same motor supply pole of the power supply terminal of the device, so that a voltage applied across the power-on transistor that exceeds a certain threshold switches off the motor power-on transistor.

6 Claims, 1 Drawing Sheet

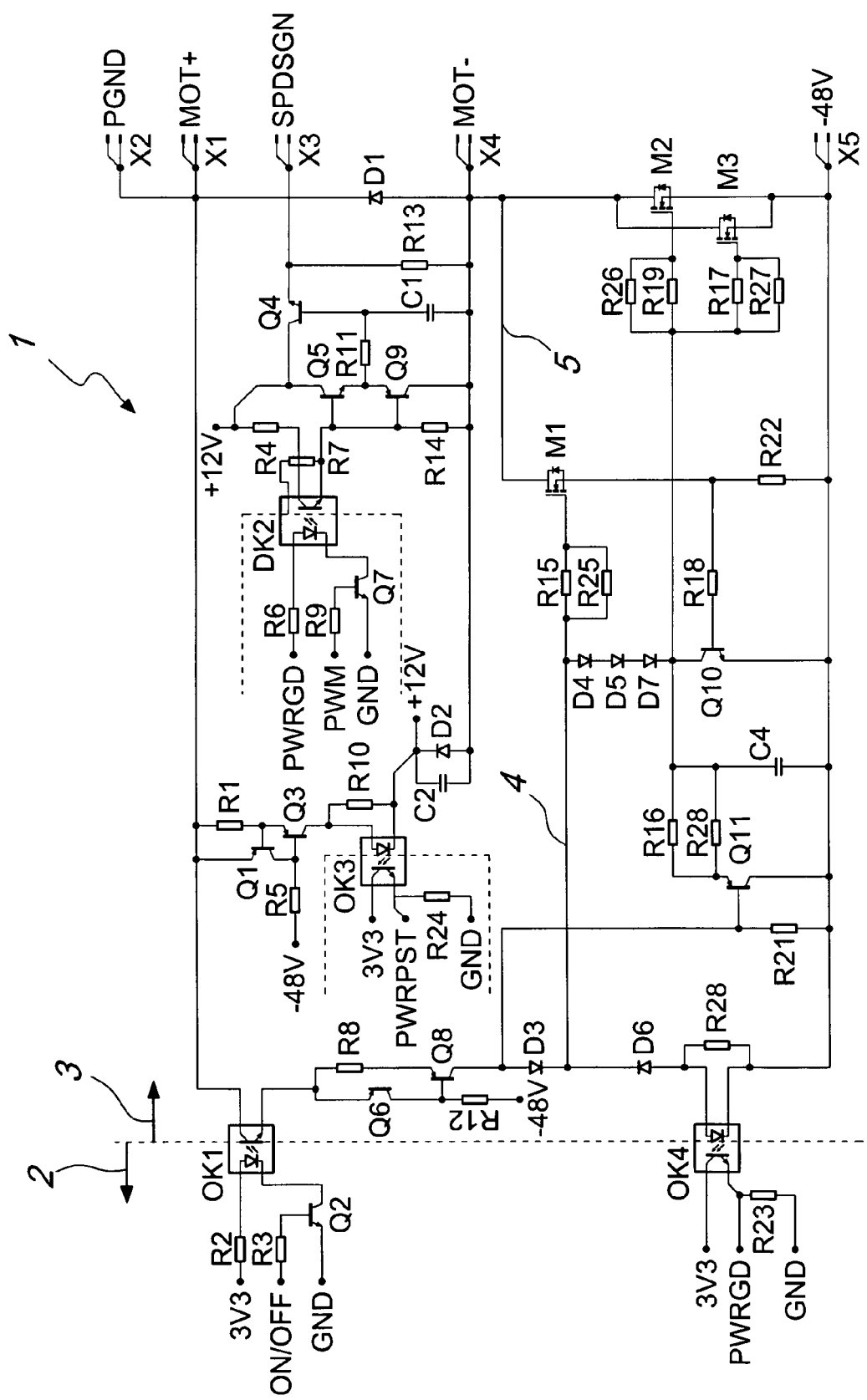

STATIC SWITCH FOR MOTORS OF CLIMATE CONTROL UNITS AND CLIMATE CONTROL UNIT COMPRISING THE SWITCH

The present invention relates to a static switch for DC motors of climate control units, particularly DC motors of the brushless type, and to a climate control unit that comprises such switch.

BACKGROUND OF THE INVENTION

The driving of DC motors, for ventilation in climate control units, is provided normally by means of electromechanically-switched DC devices, in which the coil is supplied by the same switching voltage as the load. These electromechanical devices are normally expensive, require dedicated wiring and are subject to mechanical wear. Further, depending on the power of the DC motor, it is necessary to arrange suitable protective devices, such as electromechanical switches of the magnetothermal type.

SUMMARY OF THE INVENTION

The aim of the present invention is to solve the above-mentioned drawbacks, by providing a static switch for DC motors of climate control units that allows operations for precharging and PWM driving of the DC motor and at the same time protects against any overcurrents.

Within this aim, an object of the invention is to provide a static switch that allows to modify easily the precharging current.

Another object of the invention is to provide a switch that can be implemented in a single electronic board.

Another object of the invention is to provide a switch that is highly reliable, has a long life, is relatively easy to provide and at competitive costs.

This aim and these and other objects that will become better apparent hereinafter, are achieved by a static switch according to claim 1.

BRIEF DESCRIPTION OF THE DRAWINGS

Further characteristics and advantages of the invention will become better apparent from the following detailed description of a preferred but not exclusive embodiment of the switch according to the invention, illustrated by way of non-limiting example in the accompanying FIGURE, which illustrates the electrical diagram of the switch.

DESCRIPTION OF THE PREFERRED EMBODIMENTS

A switch according to the invention, generally designated by the reference numeral 1, comprises a signal side 2 and a power side 3, respectively on the left and on the right of the broken demarcation lines shown in the FIGURE. The signal side 2 and the power side 3 are mutually separated by means of optoisolators OK1, OK2, OK3, OK4, which will be described hereinafter.

The signal side 2, which is supplied with a voltage signal 3V3 (for example 3.3 V and 30 mA) with respect to a ground GND, receives in input at least one signal ON/OFF for switching the motor on/off and a pulse width modulation signal PWM, in order to provide the amplitude modulation, on the power side 3, of a motor speed signal SPDSGN, which is fed to a suitable input of an inverter at the input of the motor, not shown in the FIGURE.

Preferably, the signal side 2 further comprises an internal signal PWRGD, which is adapted to indicate the correct supply of power to the motor and, as will be described hereinafter, to activate the PWM signal. Optionally, it is also possible to provide a service signal PWRPST to indicate that the motor is powered at at least one certain voltage, for example 15V.

The power side 3, in addition to the pin for the motor speed signal SPDSGN, comprises a positive power supply pole PGND on the power side (for example 0V), a pole that is connected to a negative power supply (for example equal to −48V) and two output pins MOT+ and MOT− for connection to the corresponding positive and negative supply poles of the DC motor. Preferably the pin MOT+ is connected directly to the positive power supply pole PGND, while the pin MOT− is connected to the negative power supply pole by means of a power switch M2 of the n-channel MOS type.

Due to the presence of the inverter at the input of the motor, between the motor power supply poles MOT+ and MOT− there is a large input capacitor $C_{IN}$, typically on the order of hundreds of microfarads. This capacitor must be pre-charged before driving the DC motor by means of the PWM signal.

In order to precharge the capacitor $C_{IN}$, the invention comprises a precharging device M1, preferably a MOS power transistor, which has a control terminal 4 connected to a power-on optoisolator OK1 and a precharging current supply terminal 5 connected to a motor power supply pole.

In the example shown in the FIGURE, the pre-charging device M1 is of the n-MOS type and the terminal 5 that corresponds to the drain branch is connected to the negative power supply pin MOT− of the motor. Further, the control terminal 4 of the precharging device, which in the illustrated example comprises the gate of the transistor M1, is connected to the power-on optoisolator OK1 by means of a protective stage, which can be formed by two BJT transistors Q6 and Q8 and by a resistor R8 connected between the base and the emitter of one of the two BJTs.

The precharging current is determined by a BJT (Q10), whose collector is connected to the control terminal 4 and whose base is connected, by means of a divider, to a source terminal of the precharging device M1. The precharging current, therefore, is substantially equal to the ratio between the base-emitter voltage of the BJT Q10 and the value of the resistor R22 between the source node of the device M1 and the negative power supply of the power side 3.

The control terminal 4 of the precharging device M1 is further connected to a charging end indicator assembly, which comprises a second optoisolator OK4. The optoisolator OK4 comprises an output terminal for the internal signal PWGRD, which is connected to an input terminal of a third optoisolator OK2, so as to enable the passage of the signal PWM toward the pole SPDSGN, by means of an output stage of the push-pull type Q5-Q9, when the internal signal PWGRD is high.

The switch 1 further comprises at least one motor power-on transistor M2, which is designed to allow the actual power-on of the DC motor at the end of the precharging period, allowing the flow of the primary current required to drive such load. The transistor M2 also acts as a current protection device.

The drain and source terminals of transistor M2 are connected between a power supply pole of the motor (MOT−) and the power side supply pole (−48V), therefore to the same poles to which the drain terminals and, indirectly, the source terminals of the device M1 are connected. Optionally, the transistor M2 can be coupled in parallel to an identical transistor M3 in order to be able to drain twice as much current from the load and therefore allow to drive power levels that are four times higher.

Optionally, the switch 1 can comprise a fourth signaling optoisolator OK3, the LED of which is connected between the power supply PGND of the power side 3 and the motor pole MOT− to which the power supply terminal of the precharging device M1 is connected. In this manner, on the output PWRPST of the signal side of the optoisolator it is possible to indicate the presence of the power supply voltage on the load (i.e., that the switch is active), thus adding auto-diagnostic capability functions to the system.

The operation of the switch according to the invention is as follows. When the motor speed signal is 0V, the motor is in a standby status and absorbs a low standby current $I_{SB}$ from the power supply of the power side 3.

Upon activation of the ON/OFF signal, the LED of the optoisolator OK1 is switched on, causing an injection of current that activates the precharging device M1, which begins to absorb a constant current through the motor.

The drain-source voltage of the device M1 decreases progressively, while the voltage on the motor, i.e., the voltage on the capacitor $C_{IN}$ of the inverter at the input of the motor, increases.

At the end of the precharging period, the voltage between the drain and the source of the device M1 is substantially equal to 0. This means that the voltage on the drain of the transistor M2 is equal to the voltage that is present on the resistor R22, which in turn is equal to the voltage between the base and the emitter of Q10, i.e., approximately 0.6V-0.7V. Therefore, when the drain-source voltage of the device M2 reaches the value of approximately 0.6V-0.7V, the power transistor M2 adapted to drive the load switches on, together with the second optoisolator OK4, determining the end of the precharging period.

The flow of current in the LED of the optoisolator OK4 generates the internal high signal PWRGD, which in turn activates the third optoisolator OK2, enabling the passage of the signal PWM toward the push-pull stage, thus generating the corresponding signal SPDSGN.

If, in this step, the voltage across the load, i.e., the voltage between the poles MOT+ and MOT−, increases beyond a certain threshold that indicates the correct supply of power to the motor, the optoisolator OK3 that indicates the presence of voltage on the load is activated.

By way of the protective function offered by the transistor M2 it is possible to avoid an excessive supply of current by the motor. Such current in fact generates a voltage drop between the source and drain terminals of the transistor M2. If this voltage drop exceeds a protection threshold, which can be quantified as approximately 0.6V-0.7V in the example shown in the FIGURE, both the transistor M2 and the second optoisolator OK4 are switched off, thus restarting the step for precharging the capacitor $C_{IN}$.

It should be noted that the pre-charging period ($T_{PC}$) is a function of the voltage $V_{IN}$ of the power side 3 (48V in the case shown in the FIGURE), of the standby current $I_{SB}$, of the charging capacitor $C_{IN}$ and of the pre-charging current ($I_{PC}=V_{BEQ10}/R_{22}$), i.e., $T_{PC}=V_{IN}*C_{IN}/(I_{PC}-I_{SB})$.

If a higher pre-charging current is required, it is simply sufficient to replace the resistor R22 with one having a lower value and optionally replace the dissipator associated with the precharging device M1 with a dissipator that has a better heat resistance.

List of illustrated components:

| | | |
|---|---|---|
| R1: 150Ω | R26: 330Ω | Q6: BC867-42 |
| R2: 330Ω | R27: 330Ω | Q7: 8C817-40 |
| R3: 15 kΩ | R28: 5.6 kΩ | Q8: 2N5401ALRAG |
| R4: 330Ω | C1: 1 μF, 16 V | Q9: BC807-40 |
| R5: 22 kΩ, ½ W | C2: 1 μF, 16 V | Q10: BC017-40 |
| R6: 220Ω | C4: 100 nF, 2BV | Q11: BC887-40 |
| R7: 100 kΩ | D1: 1N5401 | |
| R8: 158Ω | D2: BZX84C12 | |
| R9: 15 kΩ | D3: LL4146 | |
| R10: 5.6 kΩ | D4: LL4140 | |
| R11: 15 kΩ | D5: LL4148 | |
| R12: 22 kΩ, ½ | D6: B2X84C18 | |
| R13: 15 kΩ | D7: LL4148 | |
| R14: 15 kΩ | DK2: 4N25 | |
| R15: 330Ω | DK4: TLP372(F) | |
| R16: 228Ω | M1: IRF540ZP8F | |
| R17: 330Ω | M2: IRF540ZP8F | |
| R18: 1 kΩ | M3: IRF540ZP8F | |
| R19: 330Ω | OX3: TLP372(F) | |
| R21: 33 kΩ | Q1: BC807-40 | |
| R22: 4.7 kΩ, ½ W | Q2: BC817-40 | |
| R23: 5.6 kΩ | Q3: 2N5401ALRAG | |
| R24: 5.6 kΩ | Q4: BC817-40 | |
| R25: 330Ω | Q5: BC817-40 | |

In practice it has been found that the device according to the invention fully achieves the intended aim, since it allows to precharge the input capacitor of a DC motor provided with an inverter and to drive in PWM mode the DC motor once the charge has been reached. At the same time, during the driving step, the motor is protected against any overcurrents.

The device thus conceived is susceptible of numerous modifications and variations, all of which are within the scope of the appended claims; all the details may further be replaced with other technically equivalent elements.

In practice, the materials used, as well as the dimensions, may be any according to requirements and to the state of the art.

The disclosures in Italian Patent Application No. MI2007A002243 from which this application claims priority are incorporated herein by reference.

What is claimed is:

1. A static switch for DC motors of climate control units, characterized in that it comprises a signal side and a power side, which are mutually separated by means of optoisolators, said side comprising in input at least one terminal for a motor on/off signal and a terminal for a pulse width modulation signal PWM to provide the amplitude modulation, on the power side, of a motor speed signal, said switch comprising a precharging device which has a control terminal connected to a power-on optoisolator and a precharging current supply terminal connected to a motor power supply pole, said switch further comprising at least one motor power-on transistor connected to the same motor supply pole of the power supply terminal of the device, so that a voltage applied across the power-on transistor that exceeds a certain threshold switches off the motor power-on transistor.

2. The switch according to claim 1, wherein said precharging device is a MOS transistor and the precharging current is determined by a bipolar transistor or BJT, in which the collector is connected to the control terminal and the base is connected, by means of a divider, to a source terminal of the precharging device, so that the precharging current is dependent on the value of a resistor of said divider.

3. The switch according to claim 1, wherein the control terminal of the precharging device is connected to a charging end indicator assembly, which comprises a second optoisolator, said second optoisolator comprising an output terminal for an internal signal which is connected to an input terminal of a third optoisolator, said third optoisolator comprising said input terminal for the PWM signal, so that said internal signal can enable the passage of the PWM signal toward an output of said switch.

4. The switch according to claim 3, comprising a fourth signaling optoisolator, the input of which is connected between a power supply of the power side and the motor supply pole, which is connected to the power supply terminal of the precharging device, so as to generate, on an output of the fourth optoisolator, a signal when the voltage of the motor power supply pole with respect to the power supply of the power side exceeds a certain threshold.

5. The switch according to claim 1, comprising two of said power-on current transistors coupled in parallel.

6. A climate control unit, comprising a DC motor provided with an input inverter, further comprising a switch according to claim 1, connected to said inverter by means of at least said one motor power supply pole and so as to supply to the inverter said motor speed signal.

* * * * *